US012623853B2

(12) United States Patent
Mulder et al.

(10) Patent No.: US 12,623,853 B2
(45) Date of Patent: May 12, 2026

(54) SYSTEM AND METHOD FOR DETECTING BELT-PULLEY DISENGAGEMENT

(71) Applicant: Laitram, L.L.C., Harahan, LA (US)

(72) Inventors: Yorrick Mulder, Zaandam (NL);
Sven-Erik Haitjema-Burrough, Koog aan de Zaan (NL)

(73) Assignee: Laitram, L.L.C., Harahan, LA (US)

( * ) Notice: Subject to any disclaimer, the term of this patent is extended or adjusted under 35 U.S.C. 154(b) by 96 days.

(21) Appl. No.: 18/841,620

(22) PCT Filed: Jan. 18, 2023

(86) PCT No.: PCT/US2023/011037
§ 371 (c)(1),
(2) Date: Aug. 26, 2024

(87) PCT Pub. No.: WO2023/172358
PCT Pub. Date: Sep. 14, 2023

(65) Prior Publication Data
US 2025/0162809 A1       May 22, 2025

Related U.S. Application Data

(60) Provisional application No. 63/318,866, filed on Mar. 11, 2022.

(51) Int. Cl.
| | |
|---|---|
| *B65G 43/02* | (2006.01) |
| *B65G 17/08* | (2006.01) |
| *B65G 23/06* | (2006.01) |
| *B65G 43/04* | (2006.01) |

(52) U.S. Cl.
CPC ............. *B65G 43/02* (2013.01); *B65G 17/08* (2013.01); *B65G 23/06* (2013.01); *B65G*

*43/04* (2013.01); *B65G 2203/0283* (2013.01); *B65G 2203/044* (2013.01)

(58) Field of Classification Search
CPC ...... B65G 43/02; B65G 17/08; B65G 17/083; B65G 17/086; B65G 23/06; B65G 43/04; B65G 2203/0283; B65G 2203/044
USPC ........................... 198/850–853, 502.1–502.4, 198/810.01–810.04
See application file for complete search history.

(56) References Cited

U.S. PATENT DOCUMENTS

| | | | |
|---|---|---|---|
| 3,996,809 A | 12/1976 | Miller | |
| 7,540,374 B2 | 6/2009 | Rathburn et al. | |
| 8,931,628 B2 * | 1/2015 | Hill | B65G 43/02 |
| | | | 198/810.04 |
| 9,004,271 B2 * | 4/2015 | Fourney | B65G 17/08 |
| | | | 198/502.2 |

(Continued)

*Primary Examiner* — Mark A Deuble
(74) *Attorney, Agent, or Firm* — James T. Cronvich

(57) ABSTRACT

A system and method for detecting disengagement of a modular articulating conveyor belt from a toothed pulley with a laser beam. A laser transmitter and a laser detector are positioned at opposite sides of the modular conveyor belt wrapped around a toothed pulley. The laser beam is directed from the laser transmitter to the laser detector along a line that is intermittently intersected by radially outer structure on the belt as it advances fully engaged with the pulley. When the belt stretches with wear or when debris is trapped between the belt and the pulley, the belt starts to ride higher on the pulley in position to block the laser beam for longer time periods indicating disengagement of the belt from the pulley.

16 Claims, 3 Drawing Sheets

(56)　　　　　　　References Cited

U.S. PATENT DOCUMENTS

| | | | | |
|---|---|---|---|---|
| 9,772,179 | B2 * | 9/2017 | Frost | B65G 43/02 |
| 9,896,276 | B2 * | 2/2018 | Brown | B65G 43/02 |
| 10,377,574 | B2 * | 8/2019 | Hou | B65G 43/02 |
| 10,954,104 | B2 * | 3/2021 | Park | B66B 23/024 |
| 11,174,106 | B2 * | 11/2021 | San Miguel Nuñez | B65G 43/02 |
| 11,655,126 | B2 * | 5/2023 | Hirai | B65G 23/44 198/502.1 |
| 2006/0070530 | A1 | 4/2006 | Meade | |
| 2007/0012547 | A1 | 1/2007 | Depaso | |
| 2011/0093218 | A1 | 4/2011 | Vozner | |
| 2021/0032046 | A1 * | 2/2021 | Smith | G01L 5/10 |

* cited by examiner

SYSTEM AND METHOD FOR DETECTING BELT-PULLEY DISENGAGEMENT

BACKGROUND

The invention relates generally to power-driven belt conveyors and, more particularly, to systems and methods using a laser to detect belt-pulley disengagement.

Modular conveyor belts are constructed of a series of rows of one or more rigid belt modules joined by hinge rods at hinge joints. The belts are trained around drive and idle sprockets, drums, or pulleys. Teeth on the peripheries of the sprockets, drums, or pulleys positively engage drive structure in the belts. As a modular conveyor belt advances around a sprocket, drum, or pulley, it articulates at the hinge joints and assumes a polygonal shape. Each engaged row forms a side of a partial polygon.

A new conveyor belt has a nominal belt pitch defined by the distance between consecutive hinge joints. A new sprocket, drum, or pulley with a circular periphery has a nominal pulley pitch defined by the arc length between consecutive teeth. In new conveyors the belt pitch and the pulley pitch are equal or nearly equal. As the new belt wraps around the toothed pulley, it hugs the periphery in positive engagement. As the conveyor belt wears, it tends to stretch, or elongate, due to deformation of the hinge rod or wallowing of hinge eyes at the hinge joints. Belt elongation inevitably occurs in modular plastic conveyor belts.

As the belt stretches, the belt pitch exceeds the pulley pitch. When the difference in pitches is great enough, the elongated conveyor belt starts to ride up on the pulley teeth. Eventually the belt rides up high enough that it disengages from and skips a pulley tooth, which results in jerky belt motion.

Debris trapped between a belt and a pulley is another common cause of belt-pulley disengagement. The trapped debris prevents the belt from tightly hugging the pulley and causes the belt to ride higher on the pulley teeth and eventually to disengage and skip a tooth.

Belt-pulley disengagement has been detected using a laser system. A laser transmitter is positioned along one side of the conveyor belt to shoot a laser beam along a beam line radially outward of the belt where it is wrapped around the pulley. A laser detector is positioned at the other side of the conveyor belt along the laser beam's line. When the belt and toothed pulley are fully engaged, the laser beam is unblocked. But when the belt disengages, it blocks the laser beam, which indicates the disengagement. One problem with that detection scheme is that the proper positioning of the laser transmitter and detector requires that the belt be disengaged, which can damage the belt. Another problem is that detecting a single, non-recurring event and distinguishing that event from noise can be difficult.

SUMMARY

A method for detecting disengagement of a modular conveyor belt from a toothed pulley comprises: (a) operating a modular conveyor belt constructed of articulated rows of belt modules wrapped around a portion of the periphery of and engaged by teeth on a pulley having an axis of rotation; (b) aiming a laser beam across the width of the modular conveyor belt from one side along a beam line parallel to the axis of rotation at a radial distance from the axis of rotation so that the laser beam is blocked only by radially outer belt structure on the belt modules articulating around the wrapped portion of the periphery of the pulley when the modular conveyor belt is fully engaged with the pulley; (c) maintaining the laser beam along the beam line at that radial distance; (d) detecting the laser beam at the other side of the modular conveyor belt and producing a detection signal with a first level indicating that the laser beam is unblocked by belt structure and a second level indicating that the laser beam is blocked by belt structure; and (e) determining disengagement of the modular conveyor belt from the pulley when the detection signal persists at the second level for a predetermined time.

A system for detecting disengagement of a modular conveyor belt from a toothed pulley comprises a laser transmitter for transmitting a laser beam along a beam line and a laser detector spaced apart from the laser transmitter along the beam line to detect the laser beam. A pulley rotatably mounted to a conveyor frame rotates about an axis of rotation and has teeth engaged with a modular conveyor belt wrapped around a portion of the pulley. The laser transmitter and the laser detector are positioned in the conveyor frame so that the beam line is parallel to the axis of rotation at a radial distance from the axis of rotation so that the laser beam is blocked only by radially outer belt structure on the modular conveyor belt articulating around the wrapped portion of the pulley when the modular conveyor belt is fully engaged with the pulley. The laser detector produces a detection signal with a first level indicating that the laser beam in unblocked by belt structure and a second level indicating that the laser beam is blocked by belt structure. The detection signal indicates disengagement of the modular conveyor belt from the pulley when the detection signal persists at the second level for a predetermined time.

Another method for detecting disengagement of a modular conveyor belt from a toothed pulley comprises: (a) operating a modular conveyor belt constructed of articulated rows of belt modules wrapped around a portion of the periphery of and engaged by teeth on a pulley having an axis of rotation, wherein the modular conveyor belt has a nominal belt pitch and the pulley has a nominal pulley pitch; (b) aiming a laser beam across the width of the modular conveyor belt from one side along a beam line parallel to the axis of rotation at a radial distance from the axis of rotation so that the laser beam is blocked only by radially outer belt structure on the belt modules articulating around the wrapped portion of the periphery of the pulley when the difference between the belt pitch and the pulley pitch is less than a predetermined maximum distance; (c) maintaining the laser beam along the beam line at that radial distance; (d) detecting the laser beam at the other side of the modular conveyor belt and producing a detection signal with a first level indicating that the laser beam is unblocked by belt structure and a second level indicating that the laser beam is blocked by belt structure; and (e) determining disengagement of the modular conveyor belt from the pulley due to belt elongation when the detection signal persists at the second level for a predetermined time.

DETAILED DESCRIPTION

Figures 1, 2:
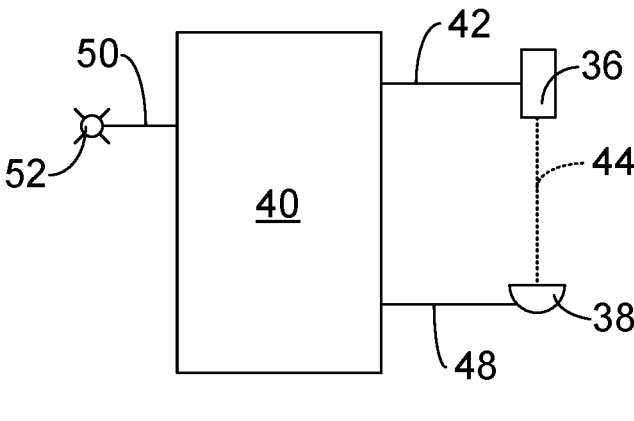
FIG. 1 is a side elevation view of one system for detecting belt-pulley disengagement.
FIG. 2 is a block diagram of the detection system of FIG. 1.

A system for detecting belt-pulley disengagement is shown in FIG. 1. A sprocket, drum, or toothed pulley 10 is mounted on a shaft 12 for rotation about an axis of rotation 14. As used in this application, "pulley" is used to encompass sprockets and drums, as well. Ends of the shaft 12 are supported in bearing blocks 16 mounted to a conveyor frame 18. A modular conveyor belt 20 is wrapped around a portion of the pulley 10. In this example the conveyor belt 20 is a roller-top belt with belt rollers 22 having salient portions protruding past the outer surface 24 of the belt. The pulley 10 has drive elements in the form of teeth 26 spaced apart at regular intervals around the pulley's periphery 28. The regular intervals define the pulley pitch.

The modular conveyor belt 20 is constructed of a series of belt-module rows 30 joined end to end at hinge joints 32 by hinge rods 34. When wrapped around the pulley 10, the conveyor belt 20 articulates at the hinge joints 32 to form a polygonal segment along the wrapped region of the pulley. The pulley teeth 26 positively engage drive structure in the conveyor belt 20 to actively drive the belt in the case of a drive pulley or to passively guide the belt in the case of an idle pulley. The distance between consecutive hinge joints 32 defines the belt pitch. When the pulley 10 and the belt 20 are new, their pitches—the nominal pulley pitch and the nominal belt pitch—are essentially equal. And full belt-pulley engagement is maintained as long as no debris is trapped between the pulley 10 and the belt 20. But, with use, the conveyor belt 20 wears and starts to stretch, and the belt pitch starts to exceed the pulley pitch. When the pitch difference exceeds a certain amount, such as about 3% of the nominal pitch, or when debris is trapped between the conveyor belt 20 and the pulley 10, the conveyor belt rides higher on the pulley teeth 26 at a radially farther distance from the shaft's axis of rotation 14. A laser transmitter 36 mounted to the conveyor frame 18 at one side of the belt 20 shoots a laser beam across the width of the belt to a laser detector 38 mounted to the frame at the other side of the belt. The laser detector 38 produces a bi-level detection signal with a first level indicating an unblocked laser beam and a second level indicating a blocked laser beam.

A block diagram of the major electrical components of the belt elongation detection system is shown in FIG. 2. A programmable processor 40, such as a programmable computer or a programmable logic controller, executes program instructions stored in a program memory to issue transmit commands over a command line 42 to the laser transmitter 36 to transmit. Alternatively, the laser transmitter 36 can be permanently energized for as long as it is powered. The transmitter 36 shoots a laser beam 44 across the width of the conveyor belt along a beam line. The laser detector 38 mounted on the beam line at the opposite side of the conveyor belt detects the laser beam and sends the bi-level detection signal 48 to the programmable processor 40. If the processor 40 executing program instructions detects a belt disengagement, it can send an alarm signal 50 to an alarm indicator 52, such as an audio alarm, a light, or a video display, so that remedial action can be taken.

Figures 3, 4:
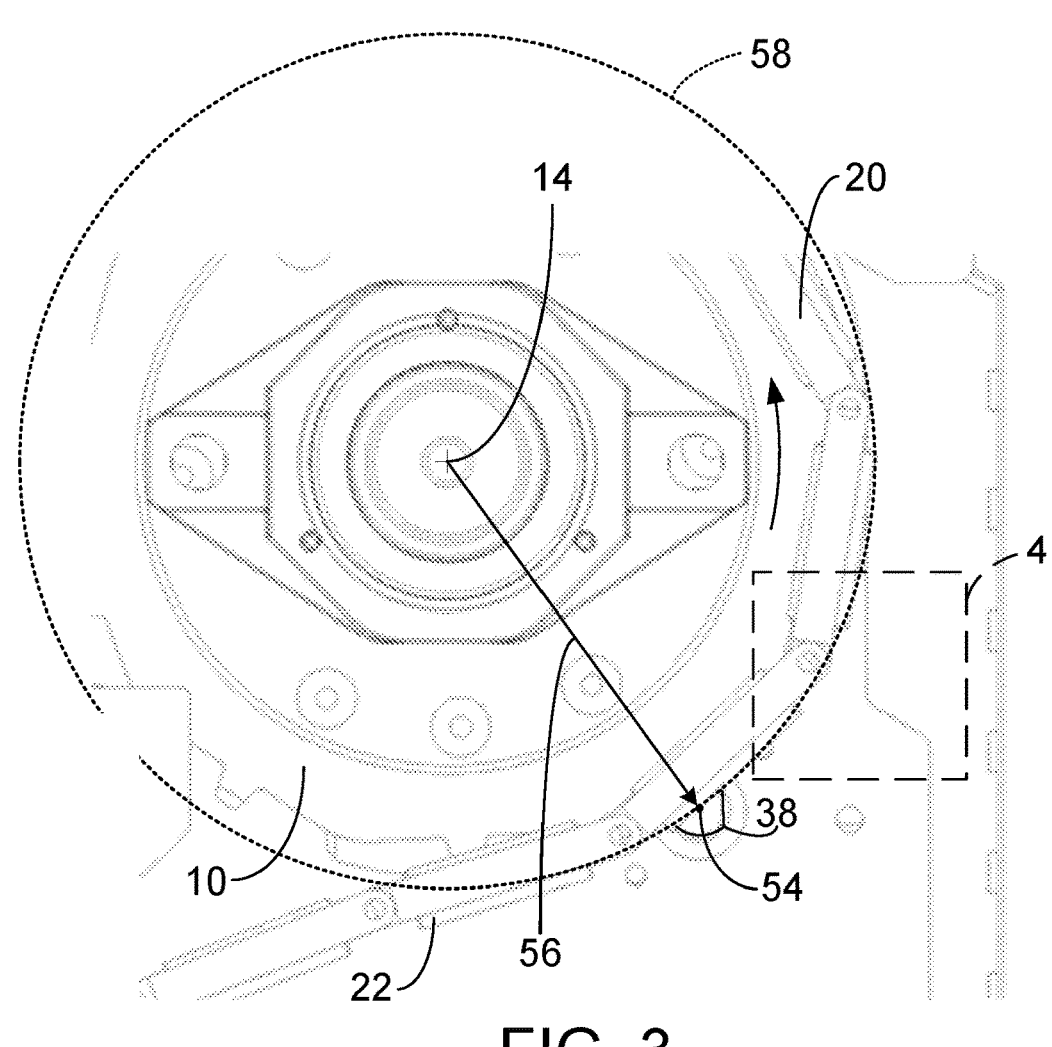
FIG. 3 is a side elevation view of the detection system as in FIG. 1 with an engaged conveyor belt.
FIG. 4 is an enlarged portion of the detection system of FIG. 3 showing how salient features of the conveyor belt intermittently block a laser beam to yield an engaged detection signal shown in a time graph of the signal.

FIG. 3 shows the positioning of the laser system relative to a fully engaged conveyor belt 20 on the toothed pulley 10.

The laser beam line 54 indicated by the dot in the middle of the laser detector 38 is fixed at a radial distance 56 from the pulley's axis of rotation 14. (The laser transmitter is omitted from FIG. 3 for clarity.) The dotted circle 58, which has a radius equal to the radial distance 56 of the beam line 54 from the pulley's axis of rotation 14, intersects the conveyor belt 20 wrapped around the pulley 10 at radially outer structure on the belt that blocks the laser beam.

The radially outer belt structure that blocks the laser beam when the belt 20 and the pulley are fully engaged is shown enlarged in FIG. 4. The structure that lies radially outward of the dotted circle 58 blocks the laser beam. In this example, that structure comprises the trailing portion of a roller 22A in a leading belt row, articulated hinge-joint structure 32, and the leading portion of a roller 22B in a trailing belt row. The hinge joints 32 forming the corners of the polygonal wrapped belt segment are radially farther outward of the rest of the module bodies, except for the rollers. The arrows from those blocking portions point to their corresponding effects on a time graph of the bi-level detection signal 60 produced by the laser detector. The high levels indicate the time during which the laser beam is blocked from reaching the laser detector. The three-pulse pattern shown in the detection signal repeats at a regular repetition period equal to the time it takes the belt and pulley to move one belt or pulley pitch. As long as the conveyor belt 20 and the pulley remain engaged, the three-pulse pattern in the bi-level detection signal 60 repeats periodically.

With a priori knowledge of the belt pitch, the processor can estimate the speed of the belt 20 from the detection signal 60. The processor computes the belt speed by dividing the belt pitch by the repetition period of the three-pulse pattern. The repetition period can be measured, for example, as the difference between consecutive rising edges of corresponding pulses in the detection signal 60. And the processor can average or otherwise filter those individual measurements of the repetition period or the individual belt-speed computations to yield a smoother, filtered estimate of belt speed.

Although the fully engaged conveyor belt 20 with rollers 22 in FIG. 3 results in the three-pulse detection signal 60 of FIG. 4, other conveyor belts may have different pulse-pattern signatures. For example, a belt with no rollers may produce only a single pulse in the detection signal during each pitch interval. In that case, the single pulse is caused only by the articulated hinge joint's blocking of the laser beam. Other belts with larger diameter rollers or other structures that extend radially outward a greater distance may allow the laser transmitter and the laser detector to be positioned farther outward of the pulley's axis of rotation— even outward of the articulated hinge joints.

FIG. 3 depicts an idle pulley 10 in which the conveyor belt 20 returns to an upper carryway from a lower returnway. Disengagement is easier to detect at an idle pulley than at a drive pulley where belt tension is greater and drive motors and gearing can limit available mounting positions. But mounting the laser system at the drive pulley may be a viable alternative in some situations.

Figure 5:
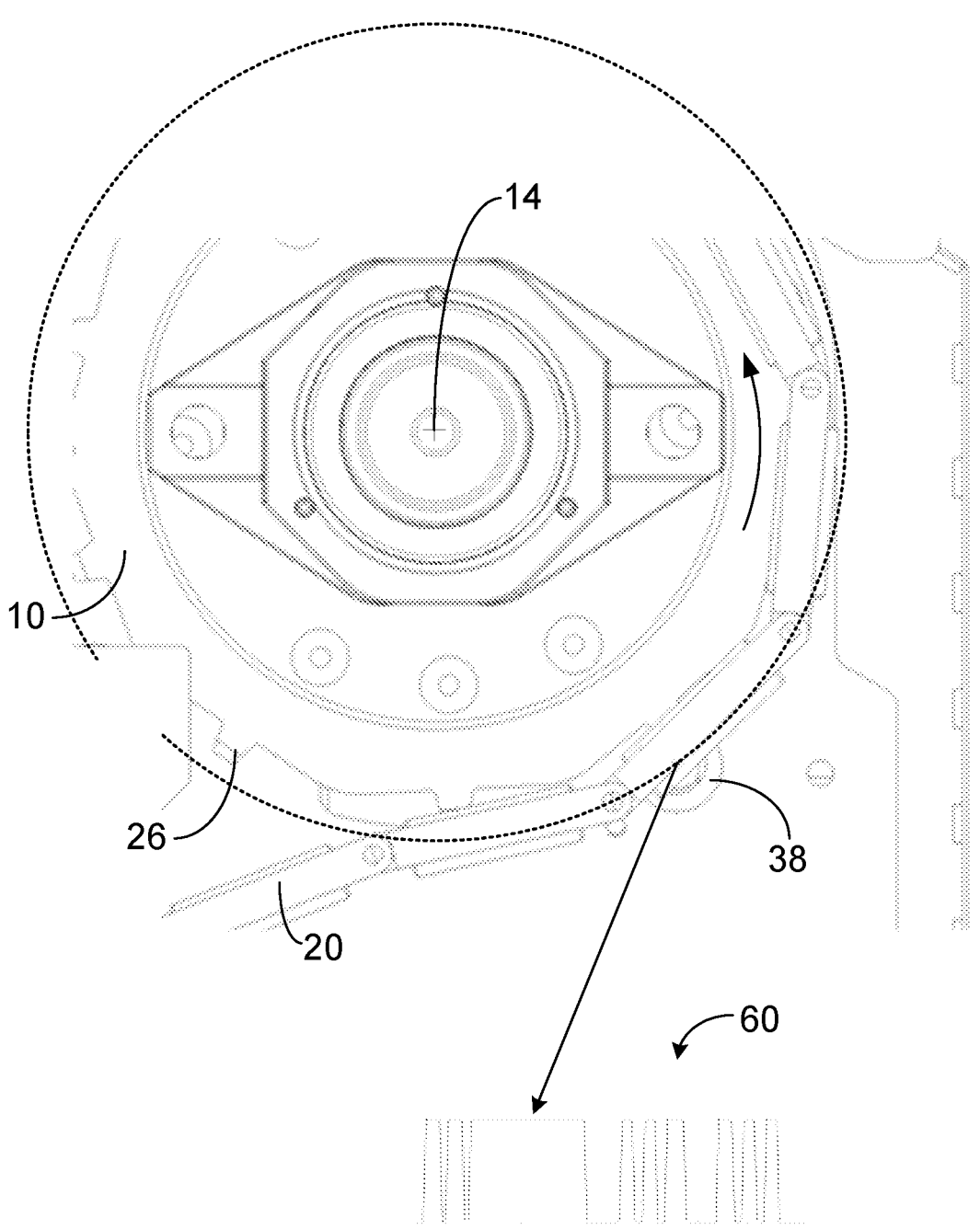
FIG. 5 is a side elevation view as in FIG. 3, but with the conveyor belt disengaged, and a time graph of the corresponding disengaged detection signal.

FIG. 5 shows the conveyor belt 20 disengaging from the pulley 10 because of belt elongation due to wear or because of debris trapped between the belt and the pulley. The disengaged belt 20 rides higher on the pulley teeth 26 at a radially farther distance from the pulley's axis of rotation 14. In that case, radially inner belt structure blocks the laser beam from reaching the laser detector 38 when the belt disengages from the pulley and skips a tooth. The result in the time graph 60 of the bi-level detection signal is a flat-line alteration of the three-pulse signature. If the programmable processor detects a flat line for a predetermined period, it determines that the belt 20 has become disengaged from the pulley 10. When that happens, the processor can set an alarm. The predetermined period can be greater than or equal to the time it takes the belt and pulley to move one pulley pitch.

What is claimed is:

1. A method for detecting disengagement of a modular conveyor belt from a toothed pulley, the method comprising:
   operating a modular conveyor belt constructed of articulated rows of belt modules wrapped around a portion of the periphery of and engaged by teeth on a pulley having an axis of rotation;
   aiming a laser beam across the width of the modular conveyor belt from one side along a beam line parallel to the axis of rotation at a radial distance from the axis of rotation so that the laser beam is blocked only by radially outer belt structure on the belt modules articulating around the wrapped portion of the periphery of the pulley when the modular conveyor belt is fully engaged with the pulley;
   maintaining the laser beam along the beam line at that radial distance;
   detecting the laser beam at the other side of the modular conveyor belt and producing a detection signal with a first level indicating that the laser beam is unblocked by belt structure and a second level indicating that the laser beam is blocked by belt structure;
   determining disengagement of the modular conveyor belt from the pulley when the detection signal persists at the second level for a predetermined time.

2. The method as claimed in claim 1 wherein the predetermined time is greater than or equal to the time it takes the pulley to advance one pulley pitch.

3. The method as claimed in claim 1 comprising producing an alarm indication when disengagement of the modular conveyor belt from the pulley is detected.

4. The method as claimed in claim 1 wherein the radially outer belt structure includes structure at hinges at which the rows articulate.

5. The method as claimed in claim 1 wherein the radially outer belt structure includes leading and trailing ends of belt rollers proximate hinges at which the rows articulate.

6. The method as claimed in claim 1 wherein the modular conveyor belt has a belt pitch and wherein the detection signal exhibits a pulse pattern that corresponds to the belt structure and alternates between the first and second levels and repeats at a repetition period corresponding to the belt pitch.

7. The method as claimed in claim 6 comprising estimating the speed of the modular conveyor belt by dividing the belt pitch by the repetition period.

8. A system for detecting disengagement of a modular conveyor belt from a toothed pulley, the system comprising:
   a laser transmitter for transmitting a laser beam along a beam line;
   a laser detector spaced apart from the laser transmitter along the beam line to detect the laser beam;
   a conveyor frame;
   a pulley rotatably mounted to the conveyor frame to rotate about an axis of rotation and having teeth engaged with a modular conveyor belt wrapped around a portion of the pulley;
   wherein the laser transmitter and the laser detector are positioned in the conveyor frame so that the beam line is parallel to the axis of rotation at a radial distance from the axis of rotation so that the laser beam is blocked only by radially outer belt structure on the modular conveyor belt articulating around the wrapped portion of the pulley when the modular conveyor belt is fully engaged with the pulley;
   wherein the laser detector produces a detection signal with a first level indicating that the laser beam in unblocked by belt structure and a second level indicating that the laser beam is blocked by belt structure; and
   wherein the detection signal indicates disengagement of the modular conveyor belt from the pulley when the detection signal persists at the second level for a predetermined time.

9. The system as claimed in claim 8 wherein the predetermined time is greater than or equal to the time it takes the pulley to advance one pulley pitch.

10. The system as claimed in claim 8 comprising a programmable processor executing program instructions to receive the detection signal from the laser detector and to determine from the detection signal whether the modular conveyor belt has disengaged from the pulley.

11. The system as claimed in claim 10 comprising an alarm indicator and wherein the programmable processor executes program instructions to send an alarm signal to the alarm indicator when the programmable processor determines that the modular conveyor belt has disengaged from the pulley.

12. The system as claimed in claim 10 wherein the modular conveyor belt has a belt pitch and wherein the detection signal exhibits a pulse pattern that corresponds to the belt structure and alternates between the first and second levels and repeats at a repetition period corresponding to the belt pitch, and wherein the programmable processor estimates the speed of the modular conveyor belt by dividing the belt pitch by the repetition period.

13. The system as claimed in claim 8 wherein the radially outer belt structure includes structure at hinges at which the rows articulate.

14. The system as claimed in claim 8 wherein the radially outer belt structure includes leading and trailing ends of belt rollers proximate hinges at which the rows articulate.

15. A method for detecting disengagement of a modular conveyor belt from a toothed pulley, the method comprising:
   operating a modular conveyor belt constructed of articulated rows of belt modules wrapped around a portion of the periphery of and engaged by teeth on a pulley having an axis of rotation, wherein the modular conveyor belt has a nominal belt pitch and the pulley has a nominal pulley pitch;
   aiming a laser beam across the width of the modular conveyor belt from one side along a beam line parallel to the axis of rotation at a radial distance from the axis of rotation so that the laser beam is blocked only by radially outer belt structure on the belt modules articulating around the wrapped portion of the periphery of the pulley when the difference between the belt pitch and the pulley pitch is less than a predetermined maximum distance;
   maintaining the laser beam along the beam line at that radial distance;
   detecting the laser beam at the other side of the modular conveyor belt and producing a detection signal with a first level indicating that the laser beam is unblocked by belt structure and a second level indicating that the laser beam is blocked by belt structure;

determining disengagement of the modular conveyor belt from the pulley due to belt elongation when the detection signal persists at the second level for a predetermined time.

16. The method as claimed in claim 15 wherein the predetermined maximum distance is 3% greater than the nominal belt pitch.

\* \* \* \* \*